(12) United States Patent
Schäfer et al.

(10) Patent No.: US 8,196,507 B2
(45) Date of Patent: Jun. 12, 2012

(54) ACTUATOR FOR ACTIVE MOTOR VEHICLE BONNET

(75) Inventors: Joachim Schäfer, Darmstadt (DE); Volker Scheuch, Sailauf (DE); Werner Schmidt, Alzenau-Hörstein (DE); Martin Zilg, Aschaffenburg/Nikheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 845 days.

(21) Appl. No.: 12/280,785

(22) PCT Filed: Feb. 26, 2007

(86) PCT No.: PCT/EP2007/001635
§ 371 (c)(1),
(2), (4) Date: Dec. 18, 2008

(87) PCT Pub. No.: WO2007/098906
PCT Pub. Date: Sep. 7, 2007

(65) Prior Publication Data
US 2009/0095151 A1 Apr. 16, 2009

(30) Foreign Application Priority Data
Feb. 27, 2006 (DE) .................. 10 2006 008 901

(51) Int. Cl.
*B60R 21/34* (2006.01)
*B62D 25/10* (2006.01)

(52) U.S. Cl. .......................................... 92/15; 180/274

(58) Field of Classification Search ................ 92/15, 23; 91/390
See application file for complete search history.

(56) References Cited

U.S. PATENT DOCUMENTS

| 6,942,056 B2 * | 9/2005 | Nadeau et al. ................. 180/274 |
| 6,971,303 B2 * | 12/2005 | Johansson et al. ........... 92/169.1 |
| 7,357,391 B2 | 4/2008 | Landwehr |
| 2009/0217814 A1 | 9/2009 | Dreyer et al. |

FOREIGN PATENT DOCUMENTS

| DE | 19712961 A1 | 10/1998 |
| DE | 10033126 A1 | 2/2001 |
| DE | 20013256 U1 | 12/2001 |
| DE | 10108882 A1 | 9/2002 |
| DE | 10247801 A1 * | 4/2004 |
| DE | 10249272 A1 | 5/2004 |
| DE | 202004009772 U1 | 9/2004 |
| DE | 20320551 U1 | 10/2004 |
| DE | 102004004987 A1 | 12/2004 |
| DE | 10331018 A1 | 2/2005 |

(Continued)

OTHER PUBLICATIONS

International Searching Authority, International Search Report for Application No. PCT/EP2007/001635, dated Feb. 27, 2006.

*Primary Examiner* — Thomas E Lazo
(74) *Attorney, Agent, or Firm* — Ingrassia Fisher & Lorenz, P.C.

(57) ABSTRACT

A pneumatic actuator is provided for an active bonnet. The pneumatic actuator includes, but is not limited to a cylinder and a piston transferable from a rest position to an extended position and lockable in its rest position. The piston, in its rest position, is held pre-stressed by a spring element in the direction of the extended state.

16 Claims, 3 Drawing Sheets

FOREIGN PATENT DOCUMENTS

| | | |
|---|---|---|
| DE | 102004004988 A1 | 8/2005 |
| DE | 102004007687 A1 | 9/2005 |
| DE | 102004056301 A1 | 4/2006 |
| DE | 102008011731 A1 | 9/2009 |
| EP | 1090819 A1 | 4/2001 |
| EP | 1745993 A1 | 1/2007 |
| WO | 2004108486 A1 | 12/2004 |

* cited by examiner

ACTUATOR FOR ACTIVE MOTOR VEHICLE BONNET

CROSS-REFERENCE TO RELATED APPLICATIONS

This application is a U.S. National-Stage entry under 35 U.S.C. §371 based on International Application No. PCT/EP2007/001635, filed Feb. 26, 2007, which was published under PCT Article 21(2) and which claims priority to German Application No. 102006008901.4, filed Feb. 27, 2006, which are all hereby incorporated in their entirety by reference.

TECHNICAL FIELD

The present invention relates to a pneumatic actuator for an active bonnet for motor vehicles.

BACKGROUND

By active bonnet a bonnet is understood which, in an accident, is lifted automatically by means of one or more actuators, in order to increase the clearance between the bonnet and the heavily deformable components located under it, and thus to provide a longer deformation path for a pedestrian hitting the bonnet. This prevents the risk of the pedestrian hitting the non-deformable vehicle body components, which could lead to life-threatening injuries.

The actuators for such a bonnet can be operated by various means. DE 197 12 961 A1 and DE 103 31 018 A1, for example, describe mechanical, spring-operated actuators. In DE 197 12 961 A1, a pressure spring acts on the body of the vehicle on the one hand, and on the other hand on an elongated hinge carrier, which at one end through a joint and another end through a catch, is anchored to the vehicle body, and which carries a multiple articulated hinge, which a movement causes to open or close the bonnet. A disadvantage of this known mechanical actuator is that it requires powerful and very heavy springs for storing the energy sufficient to rapidly open the bonnet.

A more advantageous weight-to-operational energy ratio can be achieved through using a pneumatic actuator, operated, particularly, on pyrotechnical principles, through the ignition of a propelling charge. However, pyrotechnical actuators have the problem in that the gas pressure used to operate them is only available at the moment of lifting the bonnet. In normal operating circumstances, the cylinder of such an actuator is not under pressure, and any play of the piston with respect to the cylinder is transferred to the bonnet itself, when the bonnet is held only by actuators of this type. Hence, constructions with predetermined breaking points are recommended, which, in normal operating conditions, remain intact and hold the bonnet closed securely, but, in a crash or accident, are destroyed, in order to facilitate the raising of the bonnet. The energy required to break the predetermined breaking points must be available at the same time as the energy required for lifting the bonnet, for which purpose a particularly powerful energy source must be provided. In addition to this, the destruction of the constructions with predetermined breaking points leads inevitably to an irreversible damage to the whole construction, with the result that each activation of the actuator requires costly repair work, even when the bonnet lifted by the actuators was not otherwise affected.

For this reason, there is clear demand for a pneumatic actuator for an active bonnet, which has the ability, in normal operating conditions, when it is not under pressure, to provide a solid, play-free connection between the bonnet and the vehicle body. In addition, other demands, desirable features, and characteristics will become apparent from the subsequent summary and detailed description, and the appended claims, taken in conjunction with the accompanying drawings and this background.

SUMMARY

According to an embodiment of the present invention, such an actuator comprises a cylinder and a piston which is transferred between a rest position and an extended position and which can be locked in the rest position, and a spring element, which pre-stresses the piston in its rest position in the direction of the extended state.

The pre-stress force of the spring element has to be as large as the forces acting on the bonnet under normal operating conditions during driving and on lifting or closing the bonnet, so that the bonnet stays fixed in the rest position.

Preferably, the piston is directly connected to a bonnet hinge. That way, in a collision, the hinge is lifted together with the bonnet and does not have to be broken, as is the case in many accepted embodiments, in order to enable opening the bonnet.

To efficiently limit the unwanted sideways play of the bonnet with respect to the movement direction of the piston, it is preferred that the spring element, which is on the piston next to it, attaches itself to the adjacent end of the bonnet hinge.

As a spring element, a rubbery-elastic article may be used simply and cost-effectively. Such a rubbery-elastic body can comprise a high spring constant, so that a small degree of deformation is enough to achieve the required spring force. The deformation of the body shall not be less than $\frac{1}{10}$th of the piston stroke.

Further measures to fix the spring element to the actuator can be saved if the piston rod goes through the spring element.

Preferably, the spring element is jammed on the one hand between the cylinder and on the other the hinge carrier of the bonnet hinge, which is fixed to the piston. The hinge carrier can be fixed to a piston rod by the simple means of screws.

The release of the piston and its movement into the extended state are preferably activated through a similar energy source.

In order to accomplish this, the cylinder preferably comprises a gas inlet conduit for a gas propellant, which oriented in the movement direction of the piston, and a locking projection of the piston is held in the gas inlet conduit by a cross bar.

The locking projection preferably fills up the cross section of the inlet conduit. This serves to prevent, when the actuator is operated, the gas propellant from streaming into the cylinder and pushing against the piston before the cross bar has been released from the locking projection of the piston.

In order to operate the movement of the cross bar, the cross bar shall preferably have a front side exposed to the gas and, through pressure on that side, the gas will be able to displace it from the inlet conduit.

To in order to facilitate the displacement of the cross bar, it is preferably tapered towards its front side.

When the cross bar intersects with a hole of the locking projection, it is preferably provided with at least one ridge which is in contact with the inner surface of the hole. This design minimizes the possible contact surface between the cross bar and the inner surface of the hole and so makes easier the displacement of the cross bar, which is of relevance above all in cases of non-optimal surface quality of the cross bar or the hole.

Ridges of this kind can be realized if the hole comprises particularly a round, and the cross bar a polygonal, cross-section.

It is preferable that the cross bar, at one end, comprises a shoulder, which overlaps with the hole. This shoulder ensures that even the propellant pressure that enters between the cross bar and the inner surface of the hole will also be used to propel back the cross bar.

BRIEF DESCRIPTION OF THE DRAWINGS

The embodiments of the invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
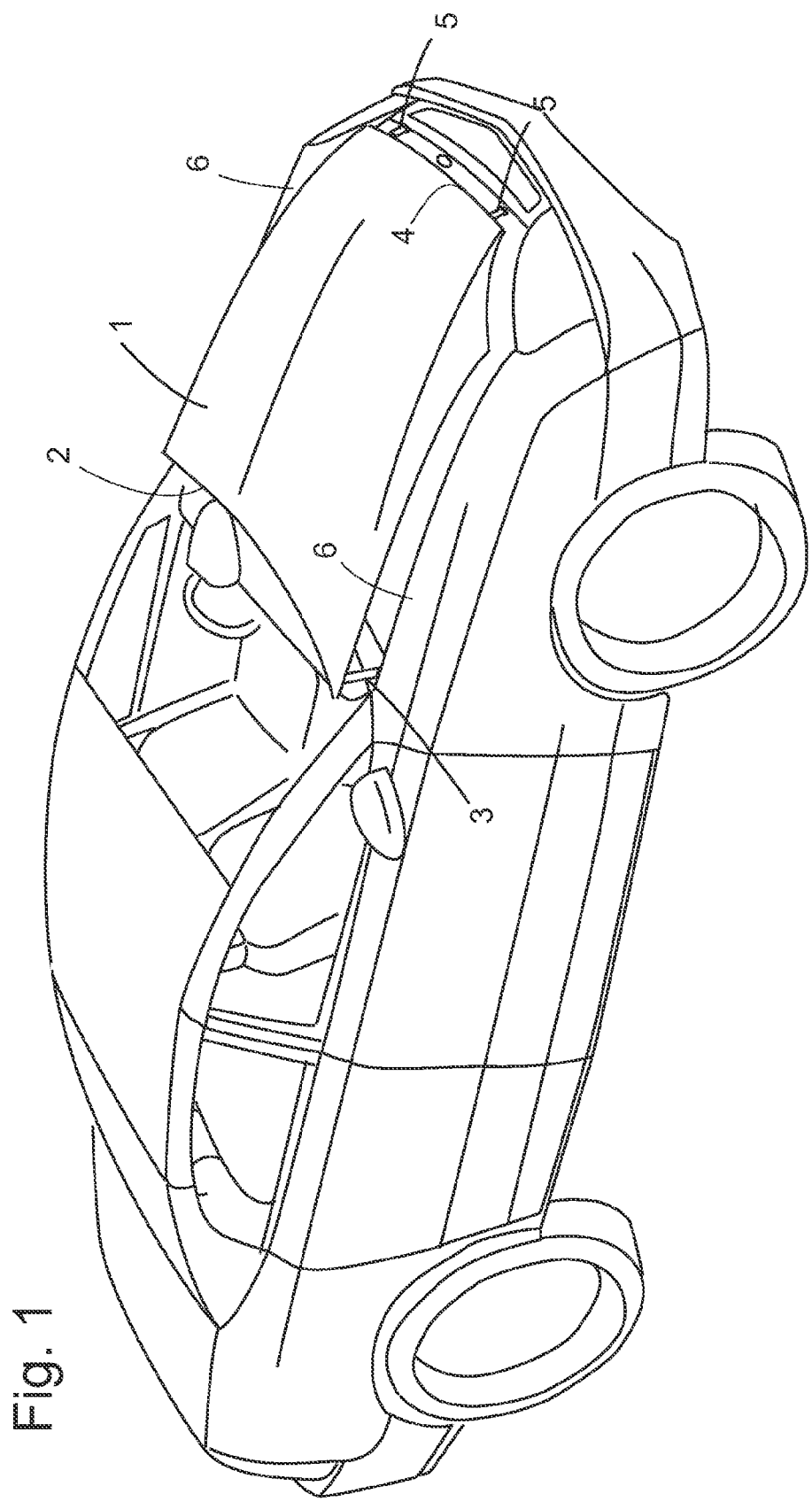
FIG. 1 is a motor vehicle with a bonnet lifted and held in an open position by the actuators.

FIG. 1 displays a schematic view of a motor vehicle with an engine bonnet 1, lifted and held in that position by actuators 5, 3 arranged adjacent to the front as well as rear frame of the bonnet 4, 2 in a raised position, in which they are connected to the adjacent vehicle body components. The bonnet 1 is supported only by the actuators 3, 5.

Figure 2:
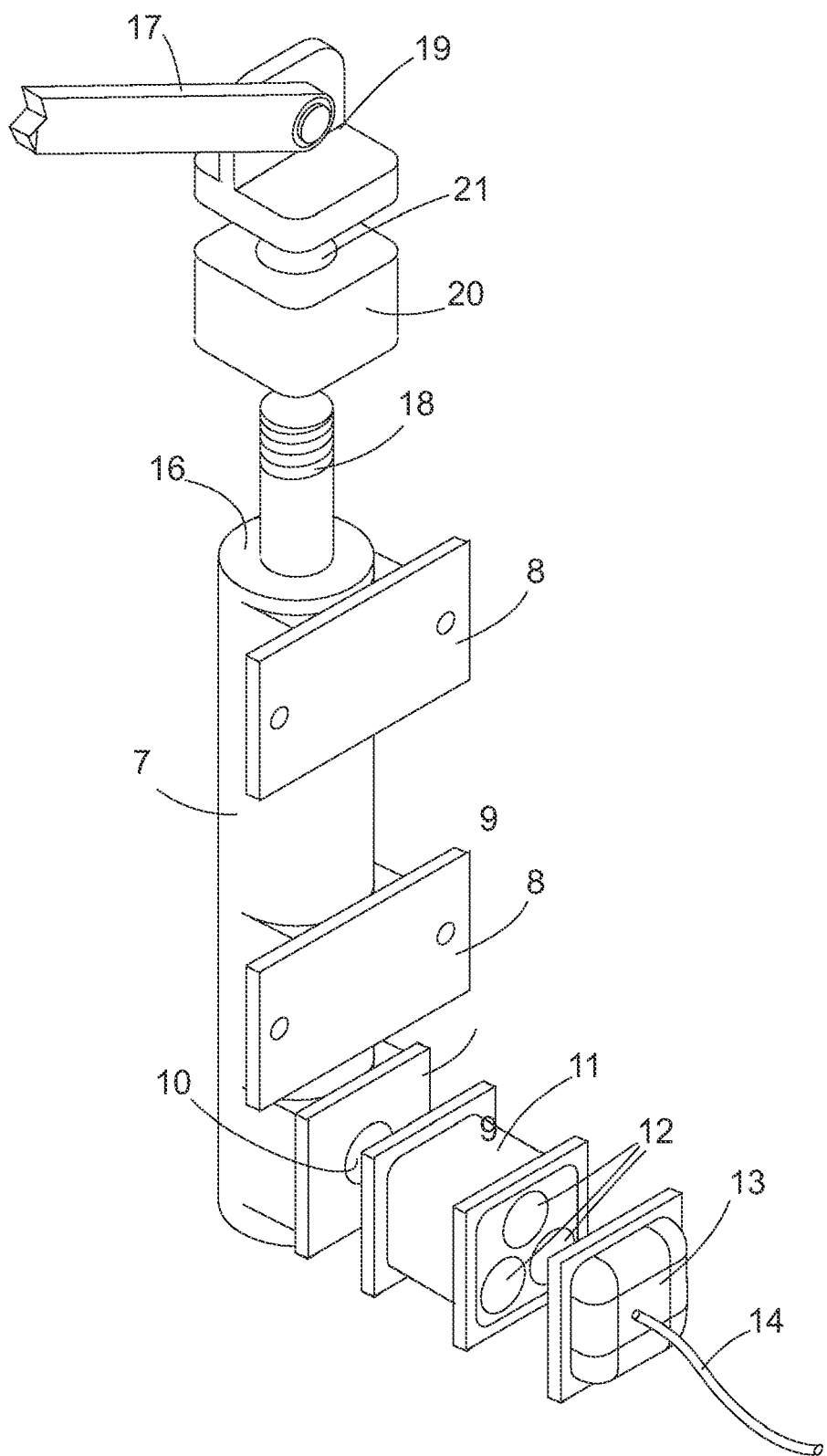
FIG. 2 is an exploded perspective view of an actuator according to an embodiment of the invention.

FIG. 2 displays an exploded perspective view of one of the two rear actuators 3. This comprises an extended cylinder 7, which has two mounting flanges for mounting the cylinder 7 on a fixed frame of the motor vehicle. On the bottom end of the cylinder 7 a gas inlet flange 9 with an inlet opening 10 provided. A gas generator carrier 11 is provided, to be affixed airtight on to the gas inlet flange 9. The gas generator carrier 11 comprises chambers for three gas generators 12, which are connected with the inlet opening 10. In between each chamber and the inlet opening 10 a destructible separator may be advisable, which breaks when the gas generator 12 is ignited in its own chamber, but which protects a gas generator 12 in housed in its own chamber from itself igniting as a result of the explosion in an adjacent chamber.

A lid 13, to be mounted on that side of the gas generator 11, which is facing the cylinder 7, contains an electric ignition device, which, on receiving the appropriate ignition command over a signal cable 14 ignites one of the gas generators 12.

The actuator in FIG. 2 is thus in the position to operate the bonnet 1 three times before it is depleted and needs to be replaced.

It should be obvious that the gas generator carrier 11 can house more or fewer than three gas generators 12. Generally, the number of the gas generators will not be greater than five or six, since the number of the times such emergency activation is expected throughout the service life of a motor vehicle is limited.

In principle, a gas generator carrier with a single gas generator could be conceivable, which would need to be replaced after each activation of the bonnet 1, while the cylinder itself could remain in the vehicle. Replacing the generator carrier, which would then be required after each activation of the bonnet 1, would however require significant safety precautions, which would be difficult to ensure in a motor vehicle repair workshop.

A piston rod 18, located at the upper front end 16 of the cylinder 7, has a threaded tip. The thread is provided in order to screw-attach a hinge carrier 19, on which a link, or, in a preferred case, a single-articulation hinge, a hinge 17, firmly attached to the bonnet, is linked. A buffer component 20 of hard rubber or any other lightly elastic deformable material with a central hole 21 is provided, to be positioned on top of the piston rod 18, and, in the rest position of the actuator, to be jammed and deformed between the hinge carrier 19 and the front 16 of the cylinder. For this purpose, the piston rod 18 is locked in a rest position within in the cylinder 7, in a manner to be described below in more detail. The deformation of the buffer component 20 is strong enough to generate a reset force that is greater than any force acting on the bonnet 1 under normal circumstances, during driving or on opening or closing the bonnet 1. Thus, under normal operating conditions the buffer component undergoes no additional deformation, which means that the hinge carrier 19 is effectively unmovable with respect to the cylinder 7 and the vehicle body to which it is attached.

Figure 3:
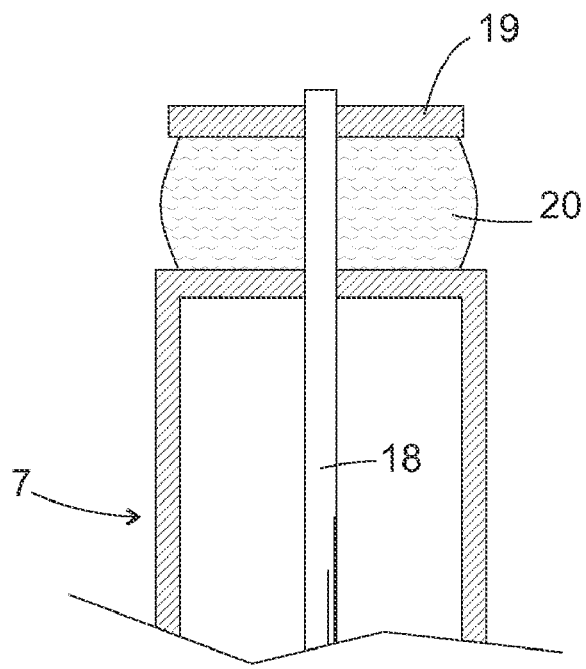
FIG. 3 is a schematic cross section of the actuator in FIG. 2.

FIG. 3 displays an axial section of the cylinder 7 in FIG. 2. The piston rod 18 is affixed to a piston plate 22, which, in the rest position shown in the figure, rests at the bottom of the interior chamber 23 of the cylinder. A gas inlet conduit has an exterior section 24, which extends from the inlet opening 10 at a right angle to the longitudinal axis of the cylinder 7, and an axially oriented inner section 25, which opens into the chamber 23 through its bottom. In the rest position shown in the figure, a locking projection 26 extends into the inner section 25, which is part of the piston 15. An upper section 27 of the locking projection 26 fills the inner section 25 of the gas inlet conduit entirely. In a lower section 28 the cross section of the locking projection 26 is reduced. Through this section 28 extends a hole 29, which is aligned with the outer section 24 of the gas inlet conduit. Hole 29 has a slidable cross bar 30. It is cylindrical in form, which tapers slightly on the front end 31 facing the inlet opening 10. A circumferential flange at the opposite end forms a shoulder 32, which is pushed against an arrester by a spring 33.

In a blind hole extending downward from the inner section 25 of the gas inlet conduit there is a blocking body 34 tiered in cross section which is held, through a 33, pushed against the lower tip of the locking projection 26.

When one of the gas generators is ignited, the gas propellant thus generated pushes against the end side 31 of the cross bar 30 and propels this back against the force of the spring 33. Since the upper section 27 of the locking projection 26 initially still bars the gas inlet, the pressure remains low in the chamber 23, and the frictional force required to slide the cross bar 30 is generated only through the buffer component 20, which pushes the hinge carrier 19 upward.

As soon as the cross bar 30 is displaced from the hole 29, the underside of the locking projection 26 is exposed to the gas pressure, and, through the pressure of the gas propellant, which has now reached the chamber 23, it is driven upwards. The blocking body 34 follows, pushed by the spring 35, the movement of the locking projection 26, until its lower step section 36 is brought up against the cross bar 30. This prevents the cross bar 30 from returning under the tension of the spring 33 to the initial position shown in the figure.

Later, once the pressure of the propellant is exhausted, the piston 15 can be simply pushed back in the cylinder 7. This causes the locking projection 26 to engage again in the gas inlet conduit, pushing back finally the blocking body 34, whereupon the cross bar 30 is returned inside the hole 29. The actuator is now ready for operation.

Figure 4:
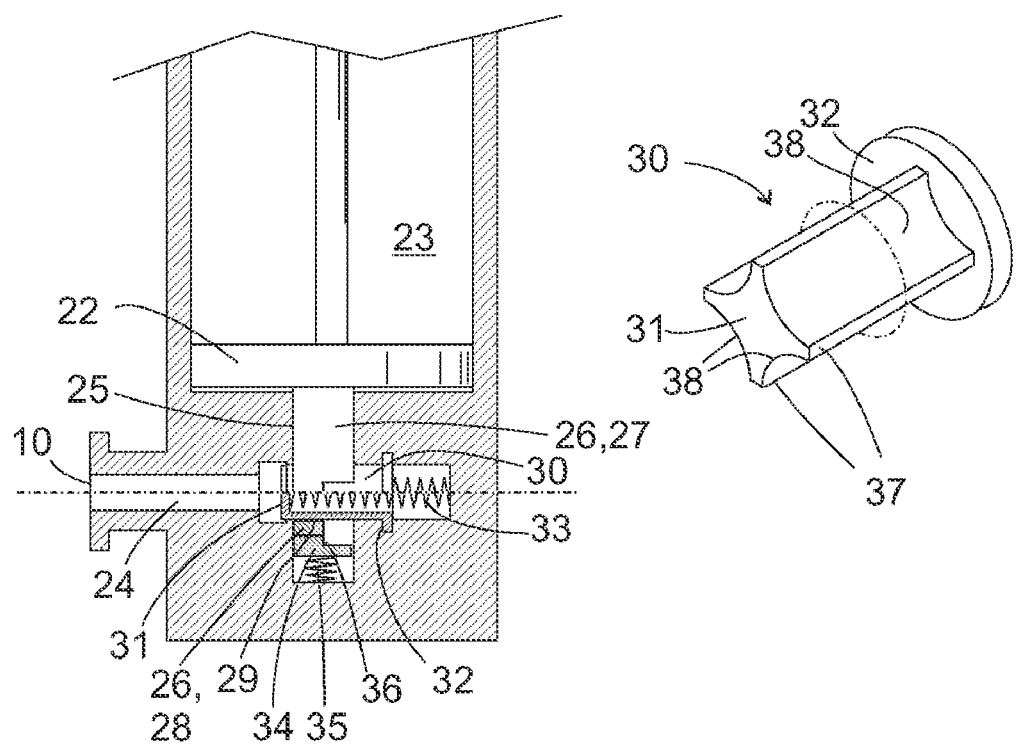
FIG. 4 is a perspective view of a cross bar usable in the actuator.

FIG. 4 displays a modified embodiment of the cross bar 30. As the cross bar 30 in FIG. 3, it is provided to engage in a round hole 29, whose outline is indicated by the dashed line in FIG. 4. The cross bar itself is however not cylindrical, but has a rhomboid shape in cross section, with four ridges 37 as the corners of the rhomboid, which are in the position to come in contact with the inner surface of the hole 29, and are separated from one another by hollowed sections 38. In an embodiment displaying this type of cross section, the decrease in the contact surface between the cross bar 30 and the hole 29 prevents the cross bar 30 from getting stuck even when its surface, or the inner surface of the hole 29, has been affected by multiple exposures to hot propellant gases from the gas generator 12.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A pneumatic actuator for an active bonnet, comprising:
   a cylinder;
   a piston at least partially within the cylinder, the piston transferable from a rest position to an extended position and lockable in the rest position, wherein the piston comprises a bonnet hinge; and
   a spring element configured to hold the piston in the rest position in a pre-stressed state in a direction of the extended position.

2. The pneumatic actuator according to claim 1, wherein the spring element is on the piston and attaches to an adjacent end of the bonnet hinge.

3. The pneumatic actuator according to claim 1, wherein the spring element is a rubbery-elastic body.

4. The pneumatic actuator according to claim 1, wherein the piston goes through the spring element.

5. The pneumatic actuator according to claim 1, wherein the spring element is jammed between the cylinder and the bonnet hinge which is fixed to the piston.

6. The pneumatic actuator according to claim 1, wherein the bonnet hinge is fixed to the piston by means of at least one screw.

7. The pneumatic actuator according to claim 6, wherein the cylinder comprises:
   a gas inlet conduit for a gas propellant, the gas inlet conduit extending in a movement direction of the piston; and
   a locking projection of the piston held in the gas inlet conduit by a cross bar.

8. The pneumatic actuator according to claim 7, wherein the locking projection entirely fills a cross section of the gas inlet conduit.

9. The pneumatic actuator according to claim 7, wherein the cross bar comprises a front side exposed to the gas propellant and is slidable through pressure of the gas propellant on the front side through the gas inlet conduit.

10. The pneumatic actuator according to claim 9, wherein the cross bar is tapered towards a front side.

11. The pneumatic actuator according to claim 9, wherein the cross bar intersects with a hole of the locking projection and comprises at least one ridge in contact with an inner surface of the hole.

12. The pneumatic actuator according to claim 11, wherein the hole comprises has a round cross-section and the cross bar has a polygonal cross-section.

13. The pneumatic actuator according to claim 11, wherein the cross bar on an end facing away from a front end comprises a shoulder that covers the hole.

14. The pneumatic actuator according to claim 1, wherein a release of the piston and a movement into the extended position utilizes a common energy source.

15. A pneumatic actuator for an active bonnet, comprising:
    a cylinder;
    a piston at least partially within the cylinder, the piston transferable from a rest position to an extended position and lockable in the rest position; and
    a spring element configured to hold the piston in the rest position in a pre-stressed state in a direction of the extended position, wherein the spring element is a rubbery-elastic body.

16. A pneumatic actuator for an active bonnet, comprising:
    a cylinder;
    a piston at least partially within the cylinder, the piston transferable from a rest position to an extended position and lockable in the rest position; and
    a spring element configured to hold the piston in the rest position in a pre-stressed state in a direction of the extended position, wherein the piston goes through the spring element.

* * * * *

UNITED STATES PATENT AND TRADEMARK OFFICE
CERTIFICATE OF CORRECTION

PATENT NO.        : 8,196,507 B2
APPLICATION NO.   : 12/280785
DATED             : June 12, 2012
INVENTOR(S)       : Joachim Shäfer et al.

It is certified that error appears in the above-identified patent and that said Letters Patent is hereby corrected as shown below:

Column 6, line 26, "the hole comprises has a" should be --the hole comprises a--.

Signed and Sealed this
Second Day of October, 2012

David J. Kappos
*Director of the United States Patent and Trademark Office*